United States Patent [19]

Snyder

[11] 4,211,250

[45] Jul. 8, 1980

[54] PRESSURE RELIEF VALVE

[75] Inventor: David E. Snyder, Longview, Tex.

[73] Assignee: U.S. Industries, Inc., New York, N.Y.

[21] Appl. No.: 853,514

[22] Filed: Nov. 21, 1977

[51] Int. Cl.² ............................................. F16K 21/10
[52] U.S. Cl. ...................................... 137/514; 137/467
[58] Field of Search ................................... 137/467, 514

[56] References Cited

U.S. PATENT DOCUMENTS

| 2,217,880 | 10/1940 | Woodson | 137/467 |
| 2,902,046 | 9/1959 | Dollison . | |
| 2,986,157 | 5/1961 | Dollison . | |
| 3,273,589 | 9/1966 | Dollison . | |
| 3,409,037 | 11/1968 | Nelson | 137/467 X |
| 3,592,222 | 7/1971 | Goss | 137/467 |

OTHER PUBLICATIONS

Otis Catolog, pp. 8, 3907.

*Primary Examiner*—Harold W. Weakley

[57] ABSTRACT

There is disclosed a pressure relief valve having an inlet to the interior thereof which comprises a passageway including an annular sealing member of resilient sealing material which has a sealing lip about its inner diameter adjacent its outer end, and a valve element slidably reciprocable within the sealing member between a closed position in which its one end extends through and beyond the lip of the sealing member, so as to contain fluid from a source to which the inlet is connected, and an open position in which its lower end is removed from within the sleeve so as to permit said fluid from the inlet to be exhausted through an outlet or vent port from the interior of the valve. A stem on the valve element is guidably reciprocable within the valve body, and a spring surrounding the stem is contained at one end by the body and at the other end by a detent means which provides a connection between the stem and spring to maintain the spring in a compressed position and thereby oppose opening movement of the valve element due to control fluid acting on the valve element within the sealing member. The connection of the detent means to the stem is releasable, upon movement of the valve element toward its open position, but prior to withdrawal of its end from the lip of the sealing member, whereby further opening movement of the valving element is unopposed by the spring, and the detent means has means for automatically reconnecting the stem to the sleeve upon movement of the stem in a direction to returned the valve element to closed position.

6 Claims, 6 Drawing Figures

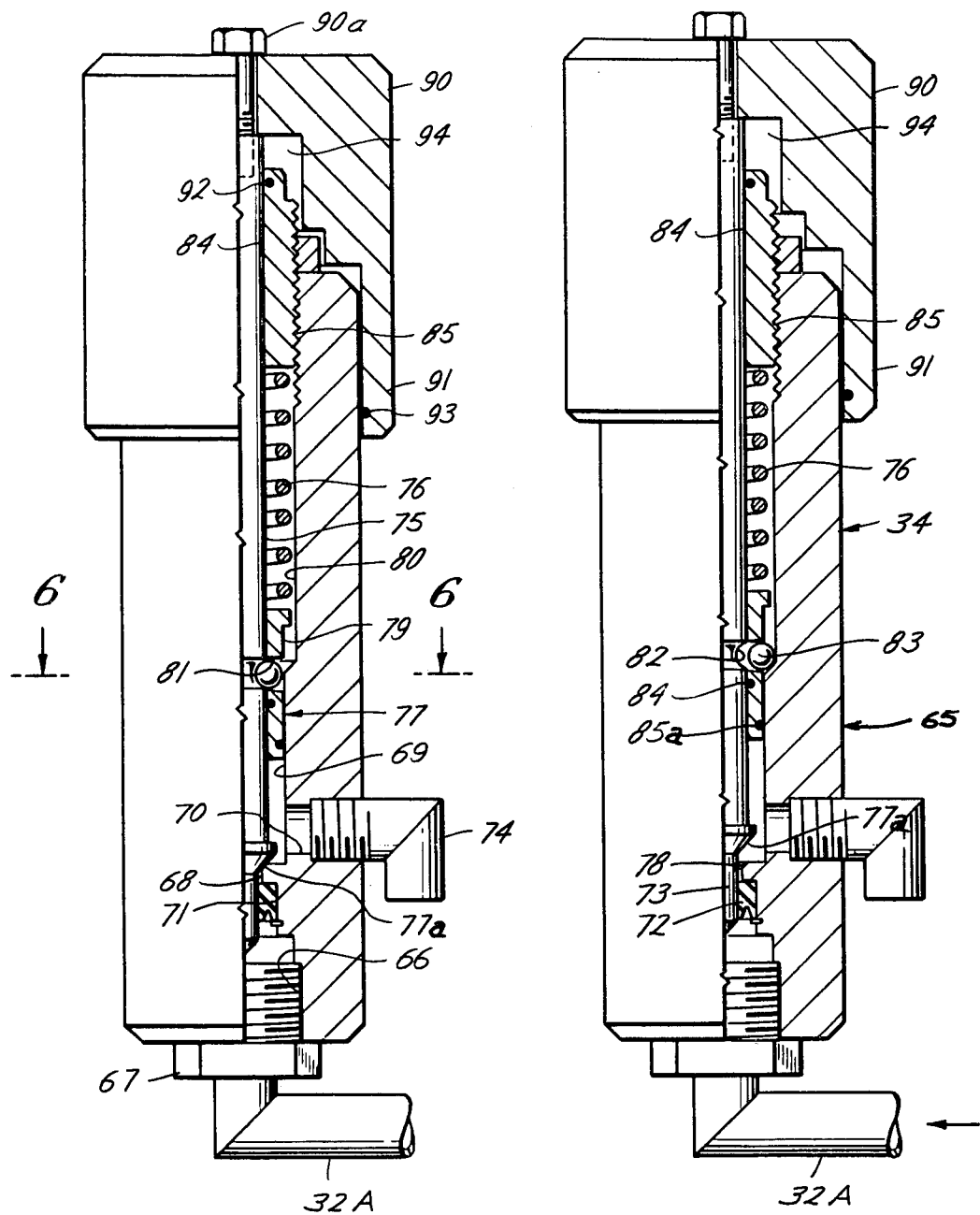

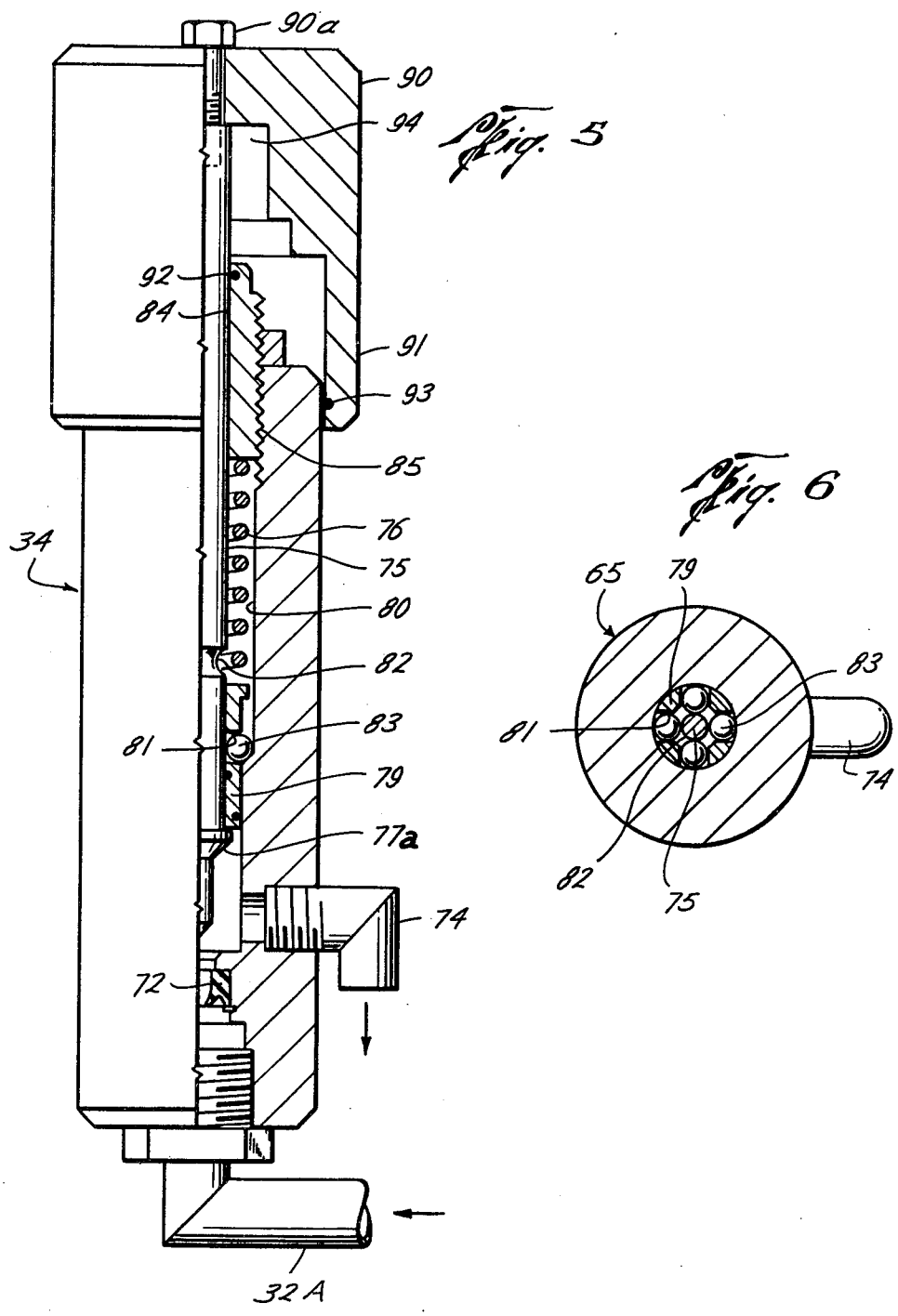

PRESSURE RELIEF VALVE

This invention relates generally to a pressure relief valve; and, more particularly, to an improved pressure relief valve which may be used to control the admission and exhaustion of operating fluid to and from a fluid-operated actuator for moving a valve in the line between flow controlling positions automatically in response to a predetermined high pressure of the line fluid. In one of its aspects, it relates to an improved relief valve of this type which is especially well suited for use in a system of this type wherein the operating fluid is line fluid and the relief valve is used in conjunction with another sensor for controlling the admission and exhaustion of the line fluid automatically in response to a predetermined low pressure of the line fluid.

In systems of this type, the admission and exhaust of fluid to and from the actuator is controlled by one or more sensors each connecting to the line and actuator. When a pair of sensors are used, one is operable to control the actuator in response to a predetermined low line pressure, and the other is operable to control the actuator in response to a predetermined high line pressure. Preferably, the fluid for operating the actuator is the line fluid to be controlled inasmuch as this eliminates the need for a separate source of operating fluid. Although I am aware of a prior system which is line pressure operated, it is of complex construction in that it requires, among other things, a velocity check valve for preventing the admission of line fluid to the sensors upon exhaustion of line pressure from the actuator. Furthermore, the high pressure relief valve is susceptible of chattering instead of fully opening in response to the rise of line pressure to a predetermined high—i.e., it may not remain open long enough to permit the velocity check valve to close. As a result, it's possible for the system to lose line pressure, and also for the vent openings in both the low pressure sensor and the high pressure relief valve to be closed, and thus prevent exhausting of operating line fluid from the actuator.

An object of this invention is to provide a relief valve of the type described which is of such construction that it will not chatter, but instead will move to a fully open position with a snap action, and will remain in such open position until manually returned to closed position.

Another object is to provide such a valve having a valve element whose opening movement is cushioned so as to avoid damage thereto.

These and other objects are accomplished, in accordance with the illustrated embodiment of the present invention, by a pressure relief valve of the type described having an inlet to the interior thereof which comprises a passageway including an annular sealing member of resilient sealing material which has a sealing lip about its inner diameter adjacent its outer end, and a valve element slidably reciprocable within the sealing member between a closed position in which its one end extends through and beyond the lip of the sealing member, so as to contain fluid from a source of which the inlet is connected, and an open position in which its lower end is removed from within the sleeve so as to permit said fluid from the inlet to be exhausted through an outlet or vent port from the interior of the valve. A stem on the valve element is guidably reciprocable within the valve body, and a spring surrounding the stem is contained at one end by the body and at the other end by a detent means which provides a connection between the stem and spring to maintain the spring in a compressed position and thereby oppose opening movement of the valve element due to control fluid acting on the valve element within the sealing member. More particularly, the connection of the detent means to the stem is releasable, upon movement of the valve element toward its open position, but prior to withdrawal of its end from the lip of the sealing member, whereby further opening movement of the valving element is unopposed by the spring, and the detent means has means for automatically reconnecting the stem to the sleeve upon movement of the stem in a direction to return the valve element to closed position.

The stem is releasably held in the position it occupies when the valve element has been moved to open position, and extends sealably through an opening in the body to provide an exterior part which may be manually depressed to move the valve element to its closed position. More particularly, a cap is mounted on the stem and has a skirt sealably slidable over the exterior of the body, as the stem is reciprocated, to form a sealed space within the cap which increases in volume as the valve element moves into its open position. Due to this increase in volume of the space, the pressure therein is decreased below that of atmospheric so as to absorb shock of the upward movement of the stem when it is released from the detent means. Additionally, the stem has a part on it which is moveable into engagement with the detent means, following the release of its connection to the spring, so that the spring further acts to absorb shock of the opening movement of the valve element.

In the illustrated embodiment of the invention, the body includes a chamber with which the inlet and outlet connect, as well as an axially extending tubular extension which is connected to the chamber by an opening through which the stem sealably extends for reciprocation as the valve element moves between open and closed positions. The detent means includes a retainer sleeve which is axially reciprocable about the stem, locking parts which are carried by the sleeve for radial movement with respect thereto, and a recess about the stem. The tubular portion of the body includes a reduced portion in which the sleeve and locking parts are closely received to retain the inner sides of the locking parts in the stem recess, so as to transmit the force of the spring to the stem when the valve element is in its closed position, and an enlarged portion into which the outer sides of the locking parts are caused to move in order to move their inner sides out of the stem recess, when the valve element is moved toward its open position but prior to withdrawal of its end from the annular sealing member, whereby further opening movement of the valve element is unopposed by the spring so that it is free to be so moved with a snap action due to the build-up of line pressure action upon the end of the stem as it is withdrawn from the sealing member. When the stem has reached the position it occupies when the valve element is fully opened, it is retained by the frictional engagement therewith of the locking parts of the detent means. Then, in reclosing the valve, the stem may be manually depressed to a position in which the locking parts are moved back into the stem recess and the sleeve back into closely received relation within the reduced portion of the body opening, so that the detent means is again positioned for locking the spring to the stem automatically in response to movement of the valve element to its closed position.

In the drawings, wherein like reference characters are used throughout to designate like parts:

FIG. 1 is a side view, partly in section and partly in elevation, of a pipeline having a valve installed therein and a fluid-operated actuator installed on the valve for moving it between line opening and closing positions, together with a system including a relief valve constructed in accordance with the present invention for use in controlling the admission and exhaustion of line fluid to and from the actuator in response to predetermined high pressure of the line fluid;

FIG. 3 is a side view, partly in section, of the pressure relief valve, with the valving element thereof in closed position.

FIG. 4 is a view similar to FIG. 3, but with the valving element moved upwardly, in response to line fluid of predetermined high pressure, for a distance just sufficient to relese the detents locking the compressed spring to the stem;

FIG. 5 is a further view similar to FIGS. 3 and 4, but upon movement of the valving element to its fully open position, and thus with its lower end withdrawn from the sealing member about the passageway of the inlet; and FIG. 6 is a cross-sectional view of the high pressure sensor, as seen along broken lines 6—6 of FIG. 3.

Figure 1:
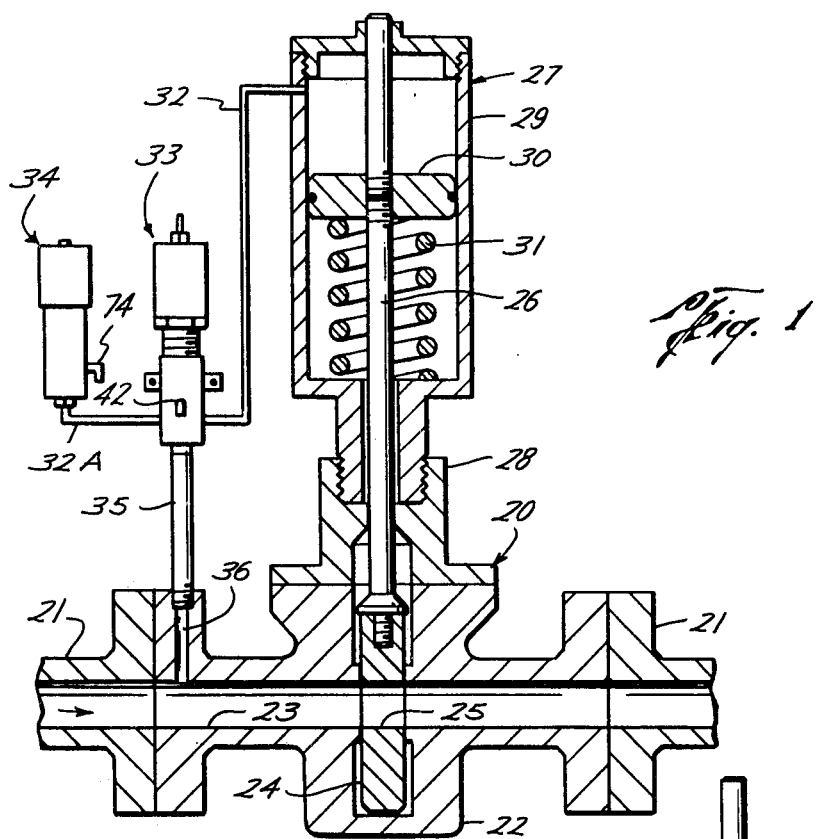
Figure 2:
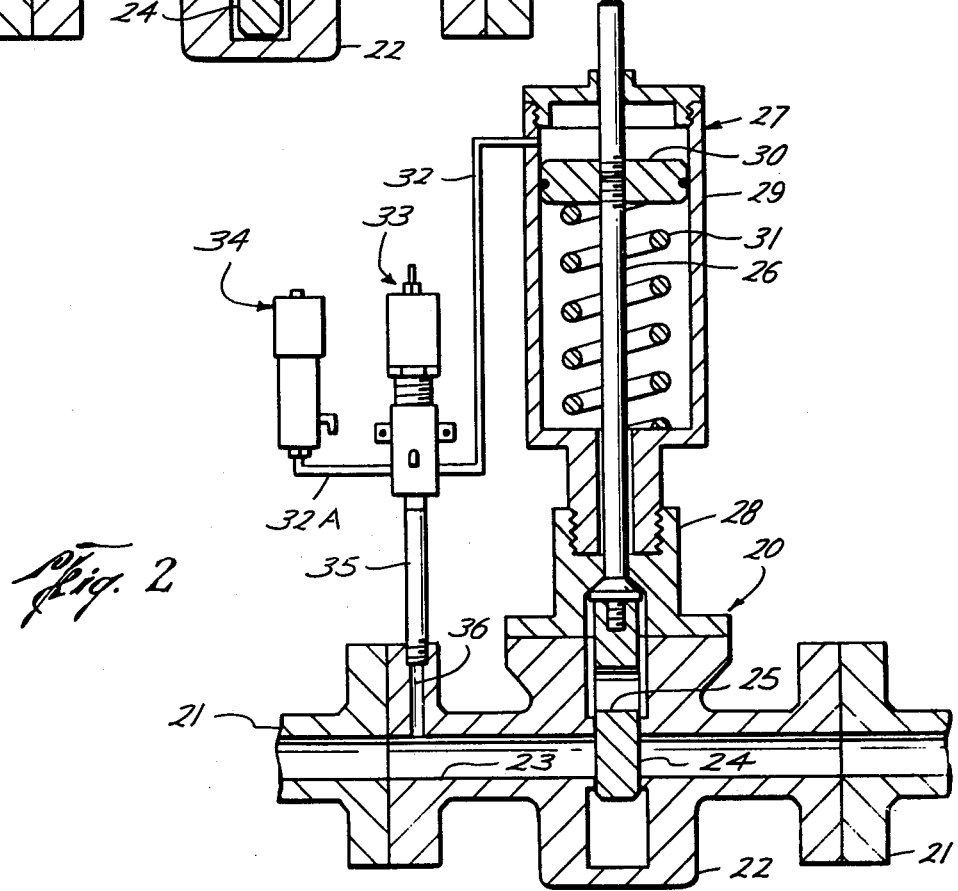
FIG. 2 is a view similar to FIG. 1, but with the line fluid exhausted from the upper end of the actuator and the line valve moved to line closing position in response to the rise of line fluid to the predetermined high value.

With reference now to the details of the above-described drawings, valve 20 shown in FIGS. 1 and 2 includes a body 22 having a flowway 23 connected in alignment with a pipeline 21, and a closure element 24 reciprocable within the valve body between the open position of FIG. 1 and the closed position of FIG. 2. The gate is of the through-conduit type having a hole 25 which is aligned with the flowway 23 in the open position of the valve, and which is raised to a position above the flowway to dispose a solid portion of the gate across the flowway in the closed position of the valve.

The closure element 24 is moved between its opened and closed positions by means of a stem 26 which extends sealably through an opening in a bonnet 28 on the valve body to permit it to be reciprocated by means of an actuator 27 installed upon the bonnet 28. The actuator includes a body providing a cylinder housing 29 and having an opening in its lower end aligned with the bonnet opening to receive the stem 26 therethrough. A piston 30 connected to stem 26 is sealably slidable within the cylinder between an upper position to raise the valve to its closed position, as shown in FIG. 2, and a lower position to lower the valve to its open position, as shown in FIG. 1.

Piston 30 is urged to its upper position by means of a coil spring 31 disposed between it and the lower end of housing 29, and is urged to its lower position by means of line fluid which is admitted thereto through conduit 32 connecting with the upper end of housing 29. As will be described in detail to follow, when line fluid is admitted through conduit 32 to the upper end of piston 30, it forces the piston downwardly against the force of spring 31 so as to open the valve. However, upon exhaustion of line fluid through conduit 32 from the actuator above piston 30, the piston is permitted to move upwardly so as to lift the valve 24 to its closed position. This alternate admission and exhaustion of line fluid to and from the actuator is controlled by means of the system which includes a low pressure sensor 33, relief valve 34 which acts as a high pressure sensor, a conduit 35 connecting flowway 23 with an inlet port to the low pressure sensor, and a conduit 32A connecting a port in the low pressure sensor with an inlet port to the relief valve.

In the system illustrated, wherein the line valve moves to closed position in response to a predetermined high or low line pressure, flow is from left to right in FIGS. 1 and 2. As will be better understood from the description to follow, this assures sufficient buildup in line pressure following tripping of the low pressure sensor to permit it to be reset.

The construction and operation of low pressure sensor 33, and its function in the overall system and thus its relationship to relief valve 34 in such a system, are fully disclosed in my copending applications filed this date, and entitled "Line Pressure Control System" and "Low Pressure Sensor". It is therefore sufficient to explain, for the purposes of this application, that in its set position, the low pressure sensor admits line fluid through the inlet port to a chamber thereof, and that such line fluid passes through the chamber and conduit 32 to the actuator so as to hold the line valve open.

At the same time, line pressure passes through the chamber of the low pressure sensor and conduit 32A to the inlet to relief valve 34, and thus acts over a valving element of the relief valve which is yieldably held in a closed position, as will be described to follow. Upon a rise in the pressure of the line fluid above a predetermined high, the valve element is caused to open and thus exhaust line fluid from the actuator through conduit 32, the low pressure sensor, conduit 32A, and the interior of the relief valve out a vent port therefrom. As described in the above-mentioned pending applications, the drop in line fluid pressure within the chamber of the low pressure sensor causes the valving means thereof to to shift to its tripped position which prevents the admission of further line fluid to the chamber, and thereby permits line fluid to be bled through the vent ports of the relief valve and low pressure sensor, thus insuring exhaustion of the actuator in order to move the line valve to closed position. As previously described, the relief valve of the present invention has particular utility in a system of this type in that it does not permit the valving elemet thereof to chatter, but instead causes it to move to and remain in a fully open position to insure that the valve means of the low pressure sensor is shifted to its tripped position.

The high pressure sensor 34 which is shown in its entirety in FIGS. 3 to 5, comprises a body 65 having a bore therein and an inlet port 66 connecting with the lower end of the interior of the body provided by the bore. More particularly, the port has a lower enlarged end which is threaded to receive a nipple 67 for connnection with conduit 32A connecting with the chamber of the low pressure sensor. The upper end of the inlet is reduced to provide a passageway 68 connecting with a chamber 69 in thelower end of the interior of the valve body, and thus with an outlet 70 from the chamber to which vent pipe 74 is connected.

One problem which is frequently encountered in the use of prior pressure relief valves of this general type is the tendency of the valving element to chatter—i.e., to open only momentarily to exhaust the high pressure fluid. This would be especially harmful in the illustrated system since it might not be possible to obtain a sufficient drop in pressure in the chamber of the low pressure sensor to cause the valve means to trip. If the valve means does not trip, line fluid within the actuator does not exhaust through conduit 32 out the vent port 74. Thus, instead of causing the line valve to close in response to this predetermined high pressure, it would instead be permitted to bleed out through the intermittent opening of the relief valve.

This problem is overcome, in accordance with the present invention, by a novel construction which includes an inlet port which is counterbored to receive an annular sealing member 72 whose inner diameter forms a portion of the passageway 68 leading to chamber 69. The passageway is opened and closed by means of an elongate, cylindrically shaped valve element 73 which, in the closed position shown in FIG. 3, is received closely within the sealing member 72, and in the open position, is moved upwardly out of the sealing member, as shown in FIG. 5. When the passageway is open, line fluid may flow through the inlet 66 and chamber 69 out the vent tube 74 so as to exhaust low pressure sensor chamber, and thus upper end of piston 30 of the actuator, to permit closing of the line valve in response to line pressure of a predetermined high value.

The valve element 73 is urged from its closed to its open position by a force due to line pressure acting upwardly over the cross-sectional area of that portion of the valve element received within sealing member 72. As will be described to follow, this force tending to open the inlet is opposed by spring pressure which is so adjusted as to permit the valve element to open only in response to fluid pressure beneath it of a predetermined high value.

More particularly, relief valve 34 opens with a snap action, and remain in that open position until manually reset. For this purpose, valving element 73 is mounted on the lower end of a stem 75 which extends upwardly within the bore through the valve body, and a coil spring 76 received within an annular space between the stem and the bore is releasably locked to the stem by detent mechanism 77 to hold the valving element 73 in its closed position until line pressure beneath the valve element reaches a predetermined high.

As best shown in FIG. 3, spring 66 will maintain the lower enlarged end 77a of the stem engaged with a seat 78 about the intersection of the passageway with chamber 69. In this position, the lower cylindrical end of the valving element 73 projects downwardly from the lower end of annular sealing member 72. The sealing member is of the "U"-shaped type having lips on the lower ends of its inner and outer diameters, which, in an uncompressed state, flare inwardly and outwardly, respectively. Thus, with the valving element in its closed position of FIG. 3, fluid pressure within the inlet 61 will urge the lips into tight sealing engagement with the valving element and with the counterbored portion 71 of the valve body.

More particularly, the valving element is of such length that its lower cylindrical end will remain beneath the lower end of the inner lip on sealing member 72 until the detent mechanism 77 releases the connection of spring 76 to stem 75. Consequently, pressure within the inlet 66 is permitted to build up before the spring pressure is released, so that, upon release of the spring pressure, valving element 73 will move upwardly to the position of FIG. 5 with a snap action.

The detent mechanism 77 includes a sleeve 79 whose lower end is closely received within a reduced diameter portion of the bore above chamber 69 and beneath the enlarged diameter portion 80 thereof forming the space in which the spring 76 is retained. The sleeve 79 is vertically reciprocable within the bore and has radial holes 81 formed therein to receive balls 83 which shift therein between locked and unlocked positions with respect to the stem 75. More particularly, a groove 82 is formed about the stem to receive the inner sides of the balls when the outer sides of the balls are opposite the reduced diameter of the bore, and thus held thereby in locking position within the groove 82. In this way, the force of the spring 76, which bears at its lower end upon the upper end of sleeve 79, and is held down at its upper end by means of nut 84 threadedly connected at 85 to the upper end of the bore, is transmitted through the detent mechanism to the stem for normally holding valve element 73 in its closed position of FIG. 3.

However, upon upward movement of the valve element, and thus the stem 75, under the influence of line pressure of a predetermined high value, the balls are carried by the stem into a position in which they are opposite the enlarged diamter spring space. More particularly, and as previously described, just prior to movement of the lower end of the cylindrical portion of the valving element above the inner sealing lip of sealing member 72, the balls 83 will be moved out of stem groove 82 and into the spring space, thereby releasing the stem and thus the valving element for upward movement with a snap action.

O-rings 85 and 85a are carried on the inner and outer diameters of sleeve 79 so that line pressure, upon opening of the valve element, will initially act over the lower end of such element and the sleeve 79, thereby providing a further force urging the stem upwardly.

The depth of grooves 82 is less than the radius of the balls 83 so that the upwardly moving stem will force the balls out of the groove and into the spring space, as shown in FIG. 4. Upon release from the detent mechanism, the stem moves upwardly to a position determined by the engagement of its enlarged lower end 77a with the lower end of the sleeve 79, as shown in FIG. 5. As the enlarged end 77a moves up into engagement with the lower end of the sleeve, the spring 76 will act as a shock absorber between the stem and the valve body in which it moves.

Upon opening of the relief valve, line fluid is of course exhausted from the chamber of the low pressure sensor out through vent tube 74. Although this exhaustion of line fluid from chamber 69 of the pilot valve dissipates the force otherwise urging the stem upwardly, the stem is held in its upper position, until manually reset in a manner to be described, by the frictional engagement of the inner sides of the detent balls 83 with the stem intermediate its enlarged end 77a and the recess 82. Thus, enlarged diameter of the bore is larger than the reduced diameter thereof by only an amount approximately equal to the depth of the recess 82, so that, in the position shown in FIG. 5, the inner sides of the balls 83 are held against the stem due to the force of the spring acting through the sleeve to urge the balls downwardly along the conical surface at the lower end of the spring space.

As previously described, since the relief valve remains open until manually reset, there is no reason for the valve means of the low pressure sensor not to move to tripped position in order to permit full exhaustion of the line valve actuator and prevent the bleed of line pressure out the vent tube 74. That is, since the pressure relief valve remains open, there is no danger that the valve means of the low pressure sensor will be prevented from fully tripping due to chattering of the valving element of the pressure relief valve, as might occur in prior valves of this type.

The upper end of stem 75 extends guidably through a nut 84 on the upper end of the body 65 of the relief valve to provide a part which may be depressed in order to manually reset the relief valve—i.e., return the valving element 73 to the position shown in FIG. 3. More particularly, a cap 90 is connected by a bolt 90a to the upper end of the stem, and has a skirt 91 which is disposed about the upper end of valve body 65 during reciprocation of the cap 90 with the stem between the positions of FIG. 3 and 5.

An O-ring 92 is carried by the nut 84 to form a sliding seal about the stem and an O-ring 93 is carried by the inner surface of the skirt to form a sliding seal about the upper end of body 65. These O-rings thus enclose a space 94 within the cap and on the upper end of the valve body, which space increases in volume as the stem moves upwardly from the closed position of the valving element to its open position of FIG. 5. This will at least momentarily create a vacuum during raising of the cap with the stem, and the vacuum will in turn further absorb shock due to the rapid upward movement of the stem. On the other hand, there will be slow leakage of fluid through the threaded connection 85 so as to prevent a vapor lock when the cap is depressed with the stem in order to manually reset the relief valve.

As also described in one or both of the abovedescribed copending applications, the system may be reset by moving the valving element 73 to closed position, and causing the valve means of the low pressure sensor to be reset. If, on the other hand, the actuator is exhausted due to tripping of the valve means of the low pressure sensor, in response to a drop in the pressure of the line fluid thereof to a predetermined low level, the valving element 73 will remain closed. Thus, only the valve means of the low pressure sensor need be reset to reset the overall system.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pressure relief valve, comprising a body having a chamber therein with an inlet thereto and an outlet therefrom, the inlet comprising a passageway including an annular sealing member of resilient sealing material having a sealing lip about its inner diameter adjacent its outer end, a valve element slidably reciprocable within the sealing member between a closed position in which its end extends through and beyond the lip of the sealing member so as to contain fluid from a source to which the inlet is connected and an open position in which its lower end is removed from within the annular sealing member so as to permit said fluid from the inlet to be exhausted through the outlet, a stem on the valve element guidably reciprocable within the body, a spring surrounding the stem and contained at one end, and detent means providing a connection between the stem and the opposite end of the spring to maintain the spring in a compressed condition and thereby oppose opening movement of the valve element due to fluid acting on the valve element within the sealing member, the connection of said detent means to the stem being releasable, upon movement of the valve element toward its open position but prior to withdrawal of its end from the lip of the sealing member, whereby further opening movement of said element is unopposed by the spring, said detent means automatically reconnecting the stem to the sleeve upon movement of the stem in a direction to return the valve element to its closed position, said spring and detent means being enclosed with said body, and said stem having a part thereon movable into engagement with the detent means, following the release of its connection to the spring, so that the spring absorbs shock of the opening movement of the valve element.

2. A pressure relief valve of the character defined in claim 1, wherein the stem extends sealably through an opening in the body to provide an exterior part which may be depressed to move the valve element to its closed position, and a cap is mounted on the stem and has a skirt sealably slidable over the exterior of the body, as the stem is reciprocated, to form a sealed space within the cap which increases in volume as the valve element moves to its open position.

3. A pressure relief valve, comprising a body having a chamber therein with an inlet thereto and an outlet therefrom, and a bore extending from the chamber coaxially of the inlet, comprising a passageway including an annular sealing member of resilient sealing material having a sealing lip about its inner diameter adjacent its outer end, a valve element slidably reciprocable within the sealing member between a closed position in which its end extends through and beyond the lip of the sealing member so as to contain fluid from a source to which the inlet is connected and an open position in which its lower end is removed from within the annular sealing member so as to permit said fluid from the inlet to be exhausted through the outlet, a stem on the valve element extending guidably within the bore of the body for reciprocating therein as the valve element moves between opened and closed positions, a retainer sleeve axially reciprocable about the stem within the bore, locking parts carried by the sleeve for radial movement with respect thereto, and a recess about the stem, a spring within said bore held at its opposite ends between the body and the sleeve, said bore having a reduced portion in which the sleeve and locking parts are closely received to retain the inner sides of the locking parts in the stem recess, and thereby transmit the force of the spring to the stem, when the valve element is in its closed position, and an enlarged portion into which the outer sides of the locking parts are caused to move in order to move their inner sides out of the stem recess, when the valve element has moved toward its open position but prior to withdrawal of its end from the lip of the sealing member, whereby further opening movement of said element is unopposed by the spring, said locking parts being moved back into the stem recess and said sleeve being moved back into closely received relation within the reduced portion of the body opening, in order to hold the locking parts in the sleeve recess, automatically in response to movement of the stem in a direction to return the valve element to its closed position, and said stem having a part thereon movable into engagement with the retainer sleeve, following the release of the locking parts from the stem, so that the spring absorbs shock of the opening movement of the valve element.

4. A pressure relief valve of the character defined in claim 3, wherein said stem has a part on the exterior of the body which may be depressed to move the valve element to its closed position, and a cap mounted on the stem and has a skirt sealably slidable over the exterior of the body, as the stem is reciprocated, to form a sealed space within the cap which increases in volume as the valve element moves to its open position.

5. A pressure relief valve, comprising a body having a chamber therein with an inlet thereto and an outlet therefrom, and a bore extending from the chamber coaxially of the inlet, the inlet comprising a passageway including an annular sealing member of resilient sealing material having a sealing lip about its inner diameter adjacent its outer end, a valve element slidably reciprocable within the sealing member between a closed position in which its end extends through and beyond the lip of the sealing member so as to contain fluid from a source to which the inlet is connected and an open position in which its lower end is removed from within the annular sealing element so as to permit said fluid from the inlet to be exhausted through the outlet, a stem on the valve element guidably reciprocable within the bore of the body to form an annular space between them and extending through an opening in the outer end of the bore to provide an exterior part which may be depressed to move the valve element to closed position, a spring within the annular space and contained at one end by a shoulder on the body, and detent means within said space providing a connection between the stem and the opposite end of the spring to maintain the spring in a compressed condition and thereby oppose opening movement of the valve element due to fluid acting on the element within the sealing member, the connection of said detent means to the stem being releasable, upon movement of the valve element toward its open position but prior to withdrawal of its end from the lip of the sealing member, whereby further opening movement of said element is unopposed by the spring, and said detent means automatically reconnecting the stem to the sleeve upon movement of the stem in a direction to return the valve element to its closed position, said detent means sealing between the stem and body intermediate the chamber and body opening.

6. A pressure relief valve, comprising a body having a chamber therein with an inlet thereto and an outlet therefrom, and a bore extending from the chamber coaxially of the inlet, the inlet comprising a passageway including an annular sealing member of resilient sealing material having a sealing lip about its inner diameter adjacent its outer end, a valve element slidably reciprocable within the annular sealing member between a closed position in which its end extends through and beyond the lip of sealing member so as to contain fluid from a source to which the inlet is connected and an open position in which its lower end is removed from within the annular sealing member so as to permit said fluid from the inlet to be exhausted through the outlet, said body having an opening therein connecting with the outer end of the bore, a stem on the valve element extending within the bore of the body to form an annular space therebetween and through the body opening for reciprocating therein as the valve element moves between opened and closed positions, the outer end of the stem providing an exterior part which may be depressed to move the valve element to closed position, a retainer sleeve axially reciprocable about the stem within the space, locking parts carried by the sleeve for radial movement with respect thereto, and a recess about the stem, a spring within said space and being held at its opposite ends between a shoulder on the body and the sleeve, said bore having a reduced portion in which the sleeve and locking parts are closely received to retain the inner sides of the locking parts in the stem recess, and thereby transmit the force of the spring to the stem, when the valve element is in its closed position, and an enlarged portion into which the outer sides of the locking parts are caused to move in order to move their inner sides out of the stem recess, when the valve element has moved toward its open position but prior to withdrawal of its end from the lip of the sealing member, whereby further opening movement of said element is unopposed by the spring, and said locking parts being moved back into the stem recess and said sleeve being moved back into closely received relation within the reduced portion of the body opening, in order to hold the locking parts in the sleeve recess, automatically in response to movement of the stem in a direction to return the valve element to its closed position, said sleeve sealing between the stem and body intermediate the chamber and body opening.

* * * * *